United States Patent
Nowotarski et al.

(10) Patent No.: US 8,243,780 B2
(45) Date of Patent: Aug. 14, 2012

(54) TEST DEVICE AND METHOD OF DETECTING AN IMBALANCE IN A POWER LEVEL OF A DIGITAL CHANNEL

(76) Inventors: Adam A. Nowotarski, Indianapolis, IN (US); Pingnan Shi, Greenwood, IN (US); Walter Miller, Greenwood, IN (US)

(*) Notice: Subject to any disclaimer, the term of this patent is extended or adjusted under 35 U.S.C. 154(b) by 435 days.

(21) Appl. No.: 12/571,814

(22) Filed: Oct. 1, 2009

(65) Prior Publication Data

US 2010/0086015 A1 Apr. 8, 2010

Related U.S. Application Data

(60) Provisional application No. 61/103,382, filed on Oct. 7, 2008.

(51) Int. Cl.
*H04B 3/46* (2006.01)
*H04B 17/00* (2006.01)
*H04N 7/173* (2011.01)

(52) U.S. Cl. ........ 375/227; 375/257; 375/228; 348/193; 725/107

(58) Field of Classification Search .......... 375/224, 375/227, 228, 257; 348/180, 192, 193, 725; 348/726; 725/107, 118, 131, 139, 148, 157; 455/67.11, 67.7, 226.1, 226.2, 226.3, 226.4
See application file for complete search history.

(56) References Cited

U.S. PATENT DOCUMENTS

| | | | |
|---|---|---|---|
| 6,111,603 A * | 8/2000 | Zhang et al. | 348/193 |
| 6,954,420 B1 * | 10/2005 | Wolf et al. | 375/224 |
| 7,142,609 B2 | 11/2006 | Terreault et al. | 375/261 |
| 7,403,486 B2 | 7/2008 | Flask | 370/241 |
| 7,489,641 B2 | 2/2009 | Miller et al. | 370/241.1 |
| 2005/0286486 A1 | 12/2005 | Miller | 370/351 |
| 2007/0121712 A1 | 5/2007 | Okamoto | 375/222 |
| 2007/0275686 A1 | 11/2007 | Stevenson et al. | 455/234.1 |
| 2008/0089402 A1 * | 4/2008 | Massey et al. | 375/227 |
| 2009/0086028 A1 | 4/2009 | Miller et al. | 348/180 |
| 2009/0086858 A1 * | 4/2009 | Kaiki | 375/345 |

* cited by examiner

*Primary Examiner* — Betsy Deppe
(74) *Attorney, Agent, or Firm* — Matthew A. Pequignot; Pequignot + Myers LLC

(57) ABSTRACT

The present invention provides a test device and a method enabling automatic detection of an imbalance in a power level of a digital channel. The test device includes an attenuator, a tuner, a demodulator, and an evaluation unit. According to the method, a plurality of channels are attenuated at a plurality of attenuation levels, by means of the attenuator. A digital channel is selected from the plurality of channels, by means of the tuner. A modulation error ratio (MER) of the digital channel is measured at the plurality of attenuation levels, by means of the demodulator. A variation of the MER of the digital channel with attenuation level is then evaluated, by means of the evaluation unit, to detect an imbalance in a power level of the digital channel.

20 Claims, 7 Drawing Sheets

TEST DEVICE AND METHOD OF DETECTING AN IMBALANCE IN A POWER LEVEL OF A DIGITAL CHANNEL

CROSS-REFERENCE TO RELATED APPLICATIONS

The present invention claims priority from U.S. Provisional Patent Application No. 61/103,382 to Nowotarski, et al., filed on Oct. 7, 2008, which is incorporated herein by reference for all purposes.

TECHNICAL FIELD OF THE INVENTION

The present invention relates to test devices for analog/digital cable television (CATV) systems and to methods of testing analog/digital CATV systems.

BACKGROUND OF THE INVENTION

A typical analog/digital cable television (CATV) system provides a plurality of channels, including both analog channels and digital channels, to consumers. Ideally, the analog channels should have power levels that are substantially equal in magnitude, as should the digital channels, the power levels of the digital channels being appropriately lower than the power levels of the analog channels. However, problems in the CATV system, such as defective cable, poor maintenance, and poor setup, may lead to a power-level imbalance.

In particular, an imbalance in a power level of a digital channel may result in impaired reception of the digital channel by the consumer. For example, if the power level of the digital channel is too low relative to respective power levels of a plurality of channels, a set-top box or a TV tuner may generate spurious signals when tuned to the digital channel. To improve reception of the digital channel, the imbalance in the power level of the digital channel must be first detected and then corrected through maintenance, repair, or power-level rebalancing.

Conventional methods of detecting an imbalance in a power level of a digital channel require a user to measure respective power levels of a plurality of channels, including the digital channel, by using a sweep meter or a spectrum analyzer, for example, and to then interpret the measured power levels. However, correct interpretation of the measured power levels necessitates a certain degree of experience, knowledge, and skill on the part of the user. Thus, a test device and a method enabling automatic detection of an imbalance in a power level of a digital channel are desired.

Unfortunately, existing test devices for analog/digital CATV systems, such as those disclosed in U.S. Pat. No. 7,489,641 to Miller, et al., issued on Feb. 10, 2009, in U.S. Pat. No. 7,403,486 to Flask, issued on Jul. 22, 2008, in U.S. Pat. No. 7,142,609 to Terreault, et al., issued on Nov. 28, 2006, in U.S. Patent Application Publication No. 2009/0086028 to Miller, et al., published on Apr. 2, 2009, in U.S. Patent Application Publication No. 2008/0089402 to Massey, et al., published on Apr. 17, 2008, in U.S. Patent Application Publication No. 2007/0275686 to Stevenson, et al., published on Nov. 29, 2007, in U.S. Patent Application Publication No. 2007/0121712 to Okamoto, published on May 31, 2007, and in U.S. Patent Application Publication No. 2005/0286486 to Miller, published on Dec. 29, 2005, which are incorporated herein by reference, do not provide such an automatic detection capability.

SUMMARY OF THE INVENTION

An object of the present invention is to overcome the shortcomings of the prior art by providing a test device and a method enabling automatic detection of an imbalance in a power level of a digital channel.

Accordingly, the present invention relates to a test device for detecting an imbalance in a power level of a digital channel, comprising: an attenuator for attenuating a plurality of channels at a plurality of attenuation levels; a tuner for selecting a digital channel from the plurality of channels; a demodulator for measuring a modulation error ratio (MER) of the selected digital channel at the plurality of attenuation levels; and an evaluation unit for evaluating a variation of the MER of the selected digital channel with attenuation level to detect an imbalance in a power level of the selected digital channel.

Another aspect of the present invention relates to a method of detecting an imbalance in a power level of a digital channel, comprising: attenuating a plurality of channels at a plurality of attenuation levels; selecting a digital channel from the plurality of channels; measuring an MER of the selected digital channel at the plurality of attenuation levels; and evaluating a variation of the MER of the selected digital channel with attenuation level to detect an imbalance in a power level of the selected digital channel.

BRIEF DESCRIPTION OF THE DRAWINGS

The present invention will be described in greater detail with reference to the accompanying drawings, wherein.

DETAILED DESCRIPTION OF THE INVENTION

Figure 1:
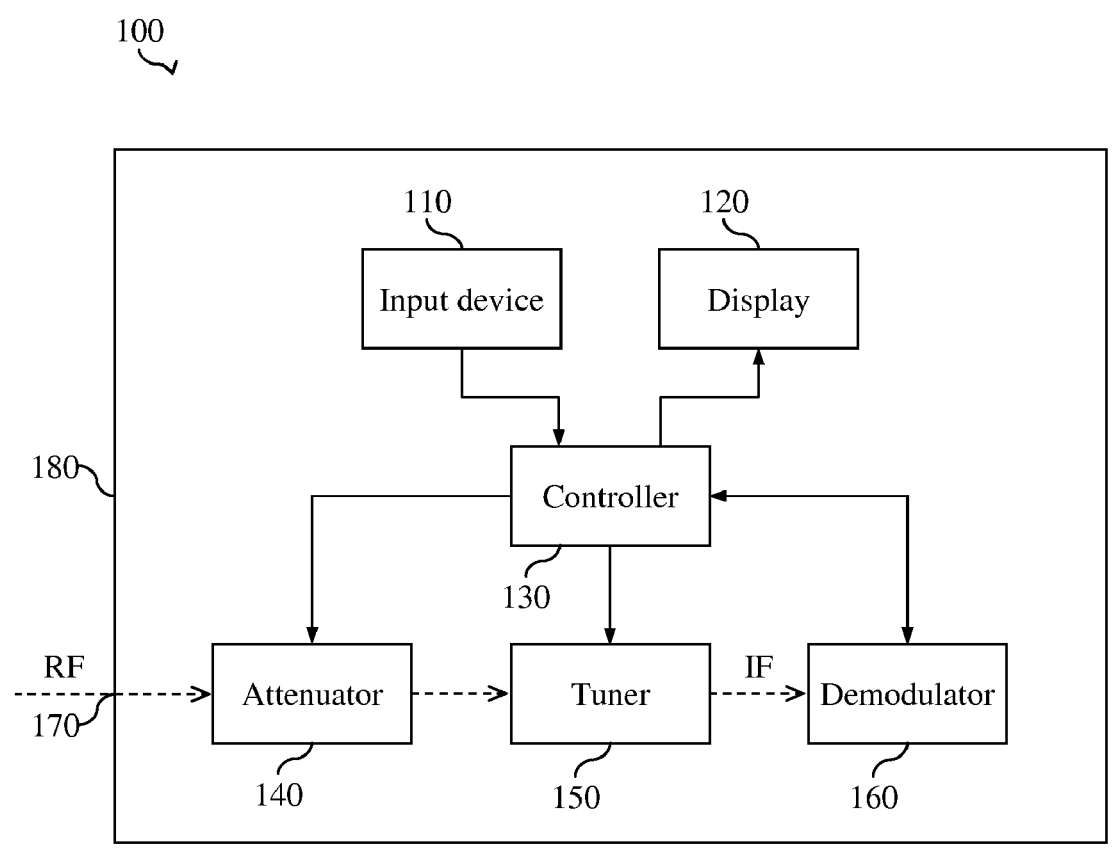
FIG. 1 is a block diagram of an embodiment of a test device according to the present invention.
Figure 2:
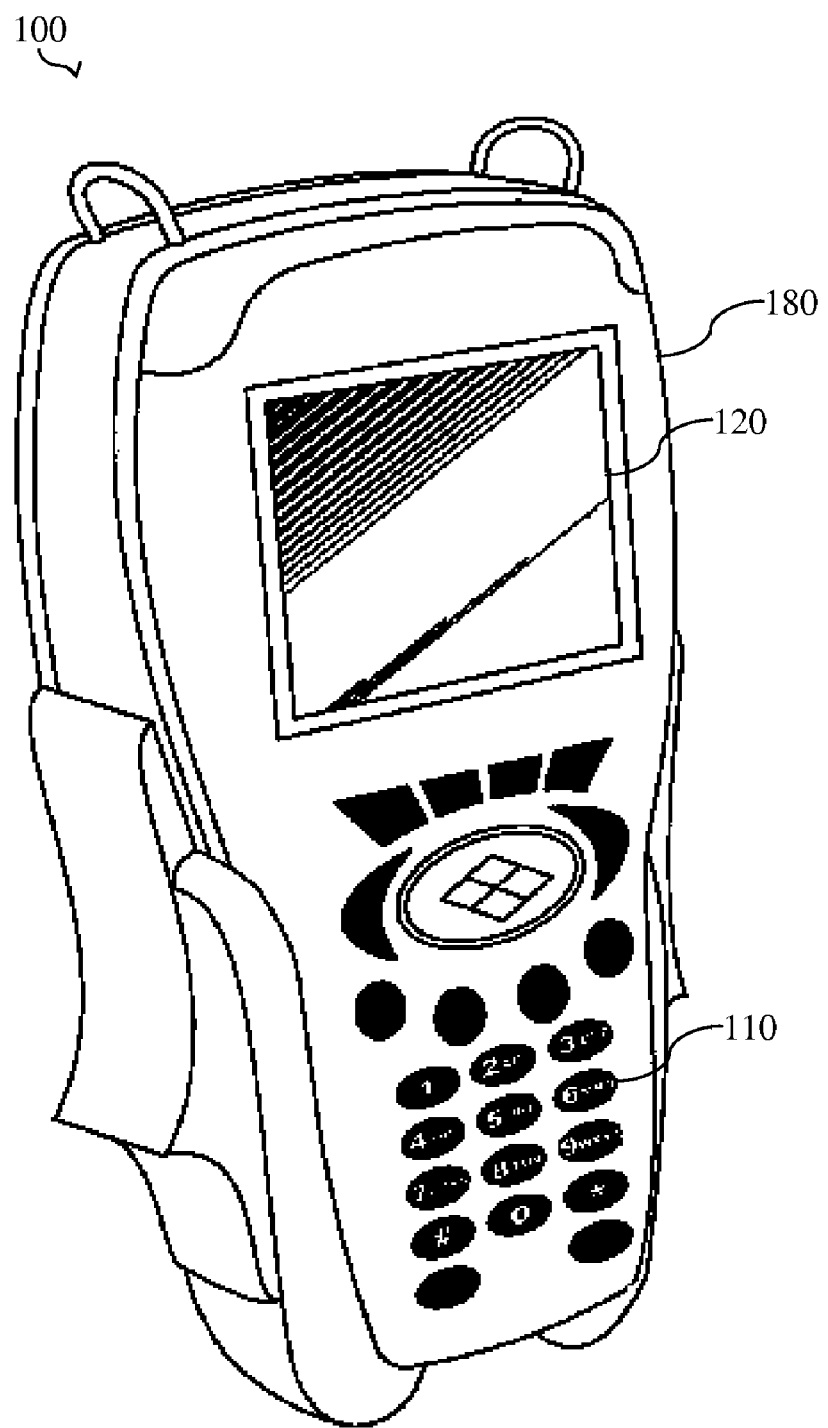
FIG. 2 is a schematic illustration of a front view of the test device of FIG. 1.
Figure 3:
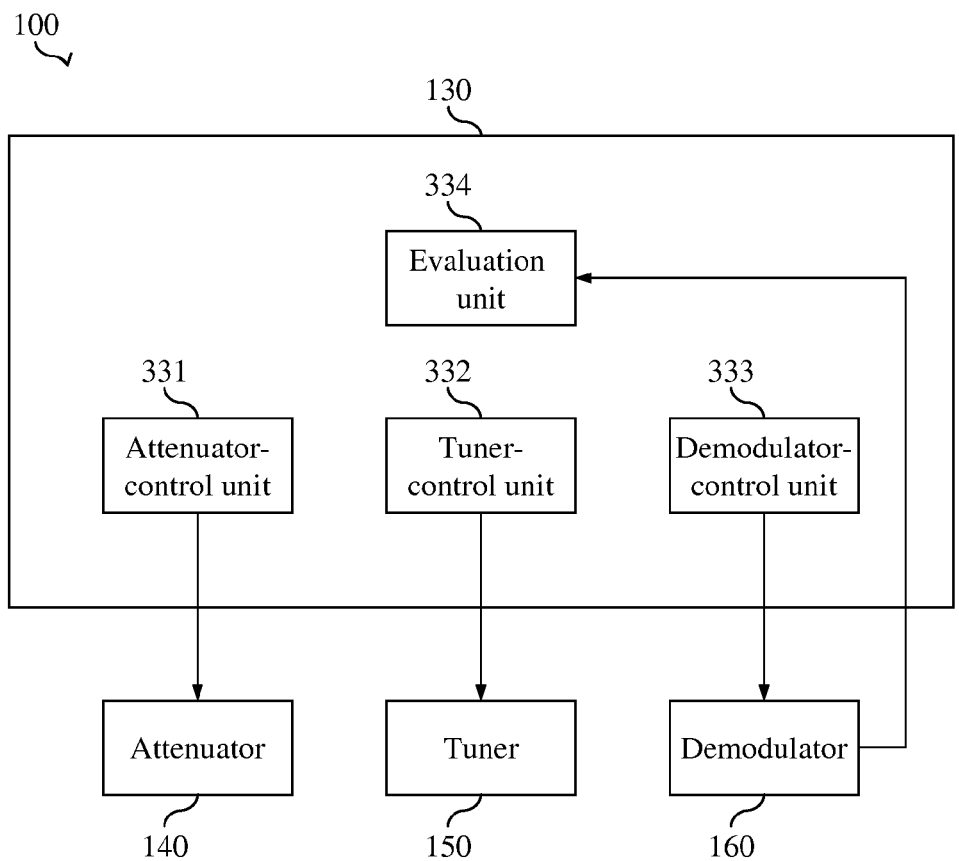
FIG. 3 is a block diagram of a portion of the test device of FIG. 1.

With reference to FIGS. 1 to 3, the present invention provides a test device 100 for detecting an imbalance in a power level of a digital channel. The test device 100 includes an input device 110, a display 120, a controller 130, an attenuator 140, a tuner 150, a demodulator 160, and a radio frequency (RF) coupler 170, all of which are supported by a common housing 180.

Preferably, the test device 100 is hand-held; however, this feature is not a requirement. In some instances, one or more of the specified components are external to the housing 180. For example, the input device 110, the display 120, and the controller 130 may be supported by a separate housing.

The input device 110 and the display 120 are connected to the controller 130, and serve as an interface between a user and the test device 100. The input device 110, which may be a keypad, a keyboard, a mouse, or the like, enables information to be communicated from the user to the controller 130. The display 120, which may be a screen, an indicator light, or the like, enables information to be communicated from the controller 130 to the user. In particular, the display 120 is capable of indicating an imbalance in a power level of a digital channel. In some instances, the input device 110 and the display 120 are combined, for example, as a touch-screen.

The controller 130 is also connected to the attenuator 140, the tuner 150, and the demodulator 160, and includes an attenuator-control unit 331, which is configured to control the attenuator 140, a tuner-control unit 332, which is configured to control the tuner 150, and a demodulator-control unit 333, which is configured to control the demodulator 160. In addition, the controller 130 includes an evaluation unit 334, which is configured to detect an imbalance in a power level of a digital channel. Preferably, the controller 130 is equipped with non-volatile memory for storing programs and configuration data.

The RF coupler 170 is connected to the attenuator 140, the attenuator 140 is connected to the tuner 150, and the tuner 150 is connected to the demodulator 160, forming a signal path. The RF coupler 170 enables the user to couple the test device 100 to a coaxial cable carrying a composite RF signal. Thereby, a plurality of channels in a cable system, preferably, an analog/digital cable television (CATV) system, may be accessed. The plurality of channels may correspond to an entire channel plan or to a subset of the channel plan.

The plurality of channels includes one or more digital channels, which are, typically, modulated by a form of quadrature amplitude modulation (QAM), for example, 64-QAM or 256-QAM. In some instances, all of the plurality of channels are digital channels. In other instances, the plurality of channels includes one or more analog channels, in addition to the one or more digital channels.

The composite RF signal is fed from the RF coupler 170 to the attenuator 140, which is capable of attenuating the plurality of channels at a plurality of attenuation levels. Preferably, the user communicates the plurality of attenuation levels to the attenuator-control unit 331 of the controller 130 via the input device 110. The attenuator-control unit 331 then directs the attenuator 140 to attenuate the plurality of channels successively at the plurality of attenuation levels, from lowest attenuation level to highest attenuation level. At each of the plurality of attenuation levels, the attenuator 140 reduces respective power levels of the plurality of channels to a substantially equal extent.

The composite RF signal is then fed from the attenuator 140 to the tuner 150, which is capable of selecting a digital channel from the plurality of channels. Preferably, the user communicates the digital channel to be selected to the tuner-control unit 332 of the controller 130 via the input device 110. The tuner-control unit 332 then directs the tuner 150 to tune to the selected digital channel. Preferably, the tuner 150 is a superheterodyne receiver, which is also capable of converting the selected digital channel to an intermediate frequency (IF) signal.

The IF signal is fed from the tuner 150 to the demodulator 160, which is capable of measuring a modulation error ratio (MER) of the selected digital channel at the plurality of attenuation levels. At each of the plurality of attenuation levels, the demodulator-control unit 333 of the controller 130 directs the demodulator 160 to demodulate the selected digital channel and to determine the MER of the selected digital channel, and the demodulator 160 communicates the MER of the selected digital channel to the evaluation unit 334 of the controller 130. The evaluation unit 334 then evaluates a variation of the MER of the selected digital channel with attenuation level to detect an imbalance in a power level of the selected digital channel, as explained hereafter.

The IF signal fed to the demodulator 160 includes both a digital signal and noise in the selected digital channel. By definition, the MER, in decibels, of the selected digital channel, as measured by means of the demodulator 160, is proportional to a logarithmic ratio of a power level $P_s$ of the digital signal to a power level $P_n$ of the noise, according to Equation (1):

$$MER \text{ (dB)} = 10\log_{10}\frac{P_s}{P_n}. \tag{1}$$

The noise in the selected digital channel includes intermodulation noise and thermal noise. The intermodulation noise consists of mixing products of the plurality of channels, which result from non-ideal behavior of active components of the tuner 150, such as amplifiers and mixers. The thermal noise results from random thermal motion of charge carriers in conducting components of the test device 100.

The power level $P_n$ of the noise may, therefore, be expressed as a sum of a power level $P_i$ of the intermodulation noise and a power level $P_t$ of the thermal noise, according to Equation (2):

$$P_n = P_i + P_t, \tag{2}$$

and the MER of the selected digital channel may be expressed using the sum of noise terms, according to Equation (3):

$$MER \text{ (dB)} = 10\log_{10}\frac{P_s}{P_i + P_t}. \tag{3}$$

Upon attenuation of the plurality of channels at the plurality of attenuation levels, by means of the attenuator 140, the power level of the digital signal, the power level of the intermodulation noise, and the power level of the thermal noise are each affected differently. The power level of the digital signal decreases with increasing attenuation level. The power level of the intermodulation noise, which is dependent on the respective power levels of the plurality of channels, also decreases with increasing attenuation level, but at a faster rate. On the other hand, the power level of the thermal noise, which is independent of the respective power levels of the plurality of channels, remains substantially constant with increasing attenuation level.

Figure 4:
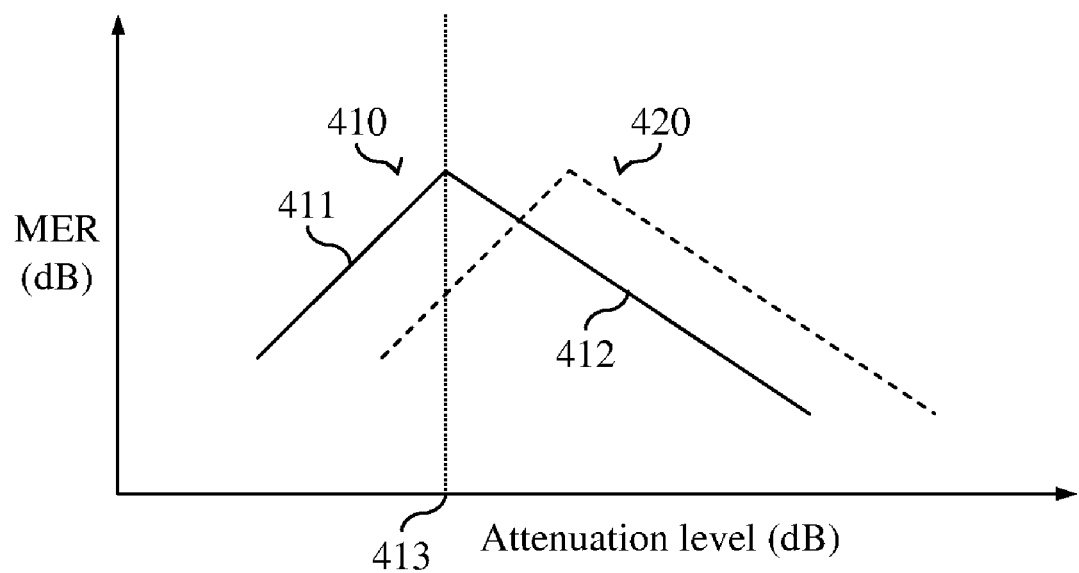
FIG. 4 is a schematic plot of modulation error ratio (MER) against attenuation level for a balanced digital channel and for an imbalanced digital channel.

With reference to FIG. 4, a first curve 410 is a schematic plot of MER against attenuation level for a balanced digital channel. In a first regime 411 of the first curve 410 at low attenuation levels, the power level of the intermodulation noise is the dominant noise term, and the MER of the balanced digital channel increases with increasing attenuation level; that is, the first curve 410 has a positive slope in the first regime 411. In a second regime 412 of the first curve 410 at high attenuation levels, the power level of the thermal noise is the dominant noise term, and the MER of the balanced digital channel decreases with increasing attenuation level; that is, the first curve 410 has a negative slope in the second regime 412. An optimal attenuation level 413, which is an attenuation level corresponding to a maximum MER of the balanced digital channel, occurs at a transition between the first regime 411 and the second regime 412, where the first curve 410 has a slope of 0.

If there is an imbalance in the power level of the selected digital channel, that is, if the power level of the selected digital channel is too low relative to the respective power levels of the plurality of channels, the intermodulation noise in the selected digital channel is more pronounced. Therefore, a second curve 420, which is a schematic plot of MER against attenuation level for an imbalanced digital channel, is shifted to higher attenuation levels relative to the first curve 410.

The present invention applies these concepts in a simple test to detect an imbalance in the power level of the selected digital channel, which is implemented in the evaluation unit 334 of the controller 130. Initially, the plurality of channels are attenuated at the optimal attenuation level 413, by means of the attenuator 140. If the selected digital channel is balanced, an increase in attenuation level from the optimal attenuation level 413 will result in a decrease in the MER of the selected digital channel, as measured by means of the demodulator 160. However, if the selected digital channel is imbalanced, an increase in attenuation level from the optimal attenuation level 413 will result in an increase in the MER of the selected digital channel, followed by a decrease in the MER of the selected digital channel, as measured by means of the demodulator 160.

If an imbalance in the power level of the selected digital channel is detected by the test, the evaluation unit 334 of the controller 130 communicates the imbalance to the display 120, which indicates the imbalance to the user.

Figure 5:
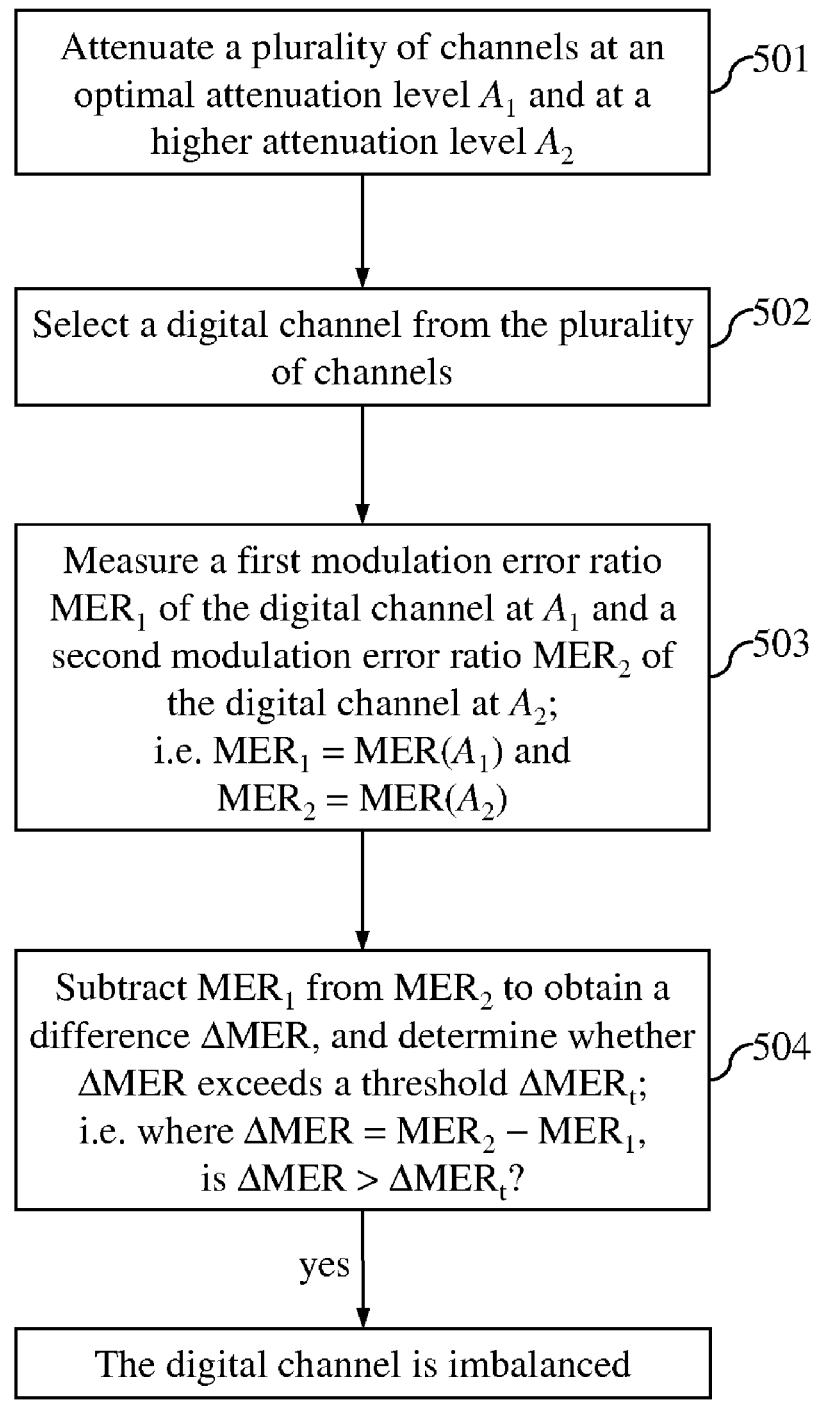
FIG. 5 is a flowchart depicting a first embodiment of a method according to the present invention.
Figure 6:
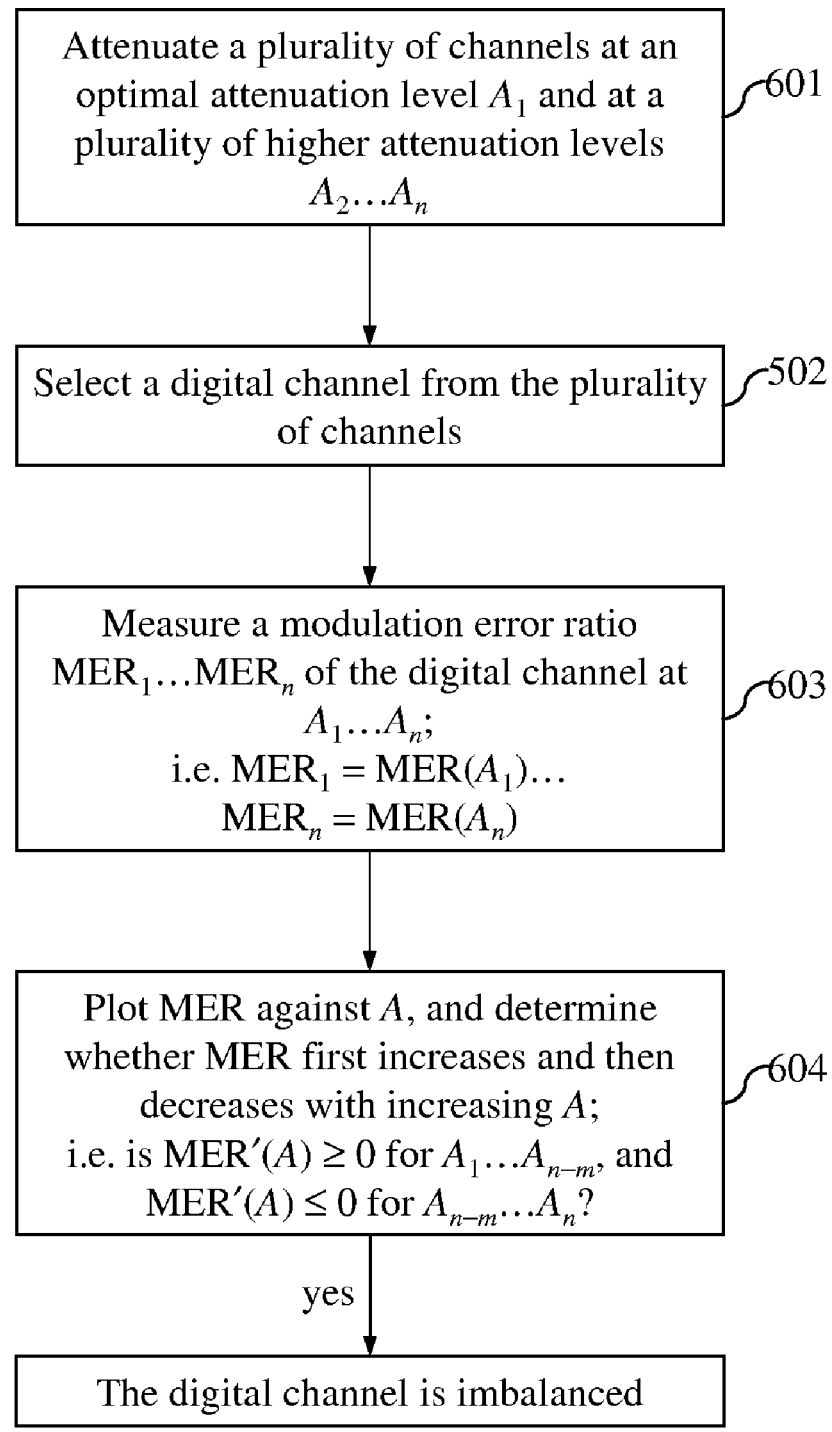
FIG. 6 is a flowchart depicting a second embodiment of the method.

The present invention also provides a method of detecting an imbalance in a power level of a digital channel, which incorporates the aforementioned test. The method includes the following steps, which are, preferably, carried out by using the test device 100. With reference to FIGS. 5 and 6, in an attenuation step 501 or 601, a plurality of channels are attenuated at a plurality of attenuation levels, by means of the attenuator 140. In a selection step 502, a digital channel is selected from the plurality of channels, by means of the tuner 150. In a measurement step 503 or 603, an MER of the selected digital channel is measured at the plurality of attenuation levels, by means of the demodulator 160. In an evaluation step 504 or 604, a variation of the MER of the selected digital channel with attenuation level is evaluated, by means of the evaluation unit 334 of the controller 130 to detect an imbalance in a power level of the selected digital channel. In instances where the plurality of channels includes a plurality of digital channels, the attenuation step 501 or 601, the selection step 502, the measurement step 503 or 603, and the evaluation step 504 or 604 may be repeated for each of the plurality of digital channels.

According to a first embodiment of the method, in the attenuation step 501, the plurality of channels are attenuated at the optimal attenuation level 413 and at a higher attenuation level. Preferably, the attenuator-control unit 331 of the controller 130 is programmed to direct the attenuator 140 to perform accordingly. The optimal attenuation level 413 and the higher attenuation level are empirically predetermined. In particular, the optimal attenuation level 413 may be empirically determined by plotting an MER of a balanced digital channel against attenuation level, as described heretofore, prior to the attenuation step 501. The optimal attenuation level 413 and the higher attenuation level are, typically, between 4 dB and 8 dB, the higher attenuation level, preferably, being at least 4 dB higher than the optimal attenuation level 413.

In the measurement step 503, a first MER of the selected digital channel is measured at the optimal attenuation level 413, and a second MER of the selected digital channel is measured at the higher attenuation level. Preferably, the demodulator-control unit 333 of the controller 130 is programmed to direct the demodulator 160 to perform accordingly. In the evaluation step 504, the first MER is subtracted from the second MER to obtain a difference, and the difference is compared to a threshold, which is empirically predetermined, and which is, preferably, greater than 2 dB. Preferably, the evaluation unit 334 of the controller 130 is programmed to perform accordingly. If it is determined that the difference exceeds the threshold, the selected digital channel is identified as imbalanced.

According to a second embodiment of the method, in the attenuation step 601, the plurality of channels are attenuated at the optimal attenuation level 413 and at a plurality of higher attenuation levels. Preferably, the attenuator-control unit 331 of the controller 130 is programmed to direct the attenuator 140 to perform accordingly. As mentioned heretofore, the optimal attenuation level 413 is empirically predetermined and is, typically, between 4 dB and 8 dB.

In the measurement step 603, the MER of the selected digital channel is measured at the optimal attenuation level 413 and at the plurality of higher attenuation levels. Preferably, the demodulator-control unit 333 of the controller 130 is programmed to direct the demodulator 160 to perform accordingly. In the evaluation step 604, the MER of the selected digital channel is plotted against attenuation level, preferably, for viewing on the display 120. Preferably, the evaluation unit 334 of the controller 130 is programmed to perform accordingly. The selected digital channel is identified as imbalanced if it is determined that the MER of the selected digital channel first increases and then decreases with increasing attenuation level, that is, if a plot of the MER of the selected digital channel against attenuation level has first a positive slope and then a negative slope with increasing attenuation level.

Figure 7:
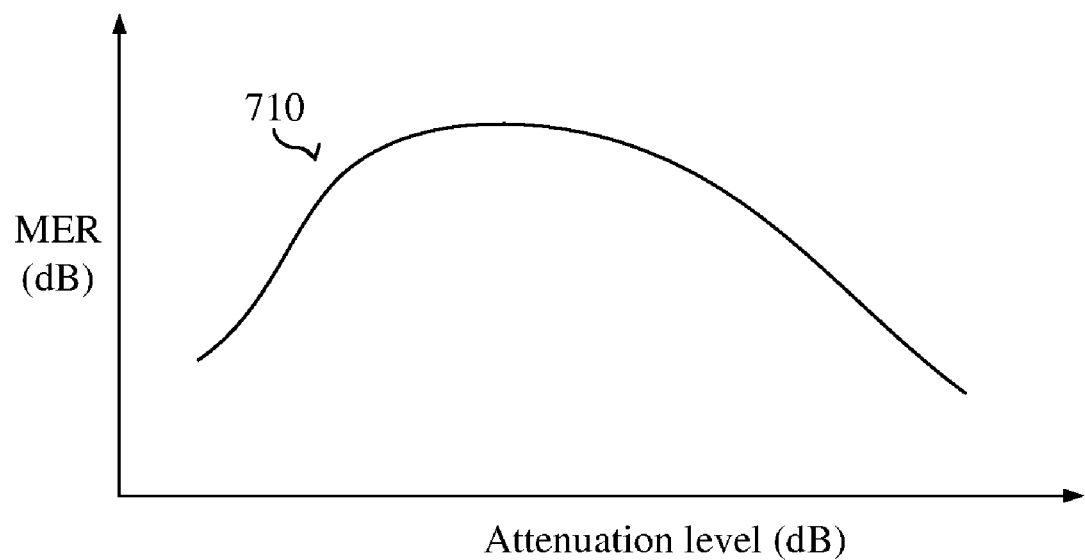
FIG. 7 is an exemplary plot of MER against attenuation level for an imbalanced digital channel.

In some instances, the imbalance in the power level of the selected digital channel is identified by means of the evaluation unit 334 of the controller 130 and indicated by means of the display 120. In other instances, the imbalance in the power level of the selected digital channel is identified by a user viewing a plot of the MER of the selected digital channel against attenuation level on the display 120. An exemplary plot 710 of MER against attenuation level for an imbalanced digital channel is illustrated in FIG. 7.

Of course, numerous other embodiments of the test device and the method provided by the present invention may be envisaged without departing from the spirit and scope of the invention.

We claim:

1. A test device for detecting an imbalance in a power level of a digital channel, comprising:
   an attenuator for attenuating a plurality of channels at a plurality of attenuation levels;
   a tuner for selecting a digital channel from the plurality of attenuated channels;
   a demodulator for measuring a modulation error ratio (MER) of the selected digital channel at the plurality of attenuation levels; and
   an evaluation unit for evaluating a variation with attenuation level of the MER of the selected digital channel at the plurality of attenuation levels to detect an imbalance in a power level of the selected digital channel.

2. The test device of claim 1, wherein the plurality of channels includes one or more digital channels and one or more analog channels.

3. The test device of claim 1, further comprising a radio frequency (RF) coupler for accessing the plurality of channels in a cable system.

4. The test device of claim 1, further comprising an attenuator-control unit for controlling the attenuator, a tuner-control unit for controlling the tuner, and a demodulator-control unit for controlling the demodulator.

5. The test device of claim 4, wherein the attenuator-control unit is programmed to attenuate the plurality of channels at an optimal attenuation level and at a higher attenuation level; wherein the demodulator-control unit is programmed to measure a first MER of the selected digital channel at the optimal attenuation level and a second MER of the selected digital channel at the higher attenuation level; and wherein the evaluation unit is programmed to subtract the first MER of the selected digital channel from the second MER of the selected digital channel to obtain a difference, and to determine whether the difference exceeds a threshold.

6. The test device of claim 5, wherein the optimal attenuation level, the higher attenuation level, and the threshold are empirically predetermined.

7. The test device of claim 4, wherein the attenuator-control unit is programmed to attenuate the plurality of channels at an optimal attenuation level and at a plurality of higher attenuation levels; wherein the demodulator-control unit is programmed to measure the MER of the selected digital channel at the optimal attenuation level and at the plurality of higher attenuation levels; and wherein the evaluation unit is programmed to plot the MER of the selected digital channel against attenuation level, and to determine whether the MER of the selected digital channel first increases and then decreases with increasing attenuation level.

8. The test device of claim 7, wherein the optimal attenuation level is empirically predetermined.

9. The test device of claim 1, wherein the tuner is a superheterodyne receiver.

10. The test device of claim 1, further comprising a display for indicating the imbalance in the power level of the selected digital channel.

11. A method of detecting an imbalance in a power level of a digital channel, comprising steps of:
 a) attenuating, by means of an attenuator, a plurality of channels at a plurality of attenuation levels;
 b) selecting, by means of a tuner, a digital channel from the plurality of attenuated channels;
 c) measuring, by means of a demodulator, an MER of the selected digital channel at the plurality of attenuation levels; and
 d) evaluating, by means of an evaluation unit, a variation with attenuation level of the MER of the selected digital channel at the plurality of attenuation levels to detect an imbalance in a power level of the selected digital channel.

12. The method of claim 11, wherein the plurality of channels includes one or more digital channels and one or more analog channels.

13. The method of claim 11, wherein the plurality of channels includes a plurality of digital channels, and wherein steps a) to d) are repeated for each of the plurality of digital channels.

14. The method of claim 11, further comprising, prior to step a), accessing the plurality of channels in a cable system.

15. The method of claim 11, wherein step a) includes attenuating the plurality of channels at an optimal attenuation level and at a higher attenuation level; wherein step c) includes measuring a first MER of the selected digital channel at the optimal attenuation level and a second MER of the selected digital channel at the higher attenuation level; and wherein step d) includes subtracting the first MER of the selected digital channel from the second MER of the selected digital channel to obtain a difference, and determining whether the difference exceeds a threshold.

16. The method of claim 15, wherein the optimal attenuation level, the higher attenuation level, and the threshold are empirically predetermined.

17. The method of claim 16, further comprising, prior to step a), empirically determining the optimal attenuation level by plotting an MER of a balanced digital channel against attenuation level.

18. The method of claim 11, wherein step a) includes attenuating the plurality of channels at an optimal attenuation level and at a plurality of higher attenuation levels; wherein step c) includes measuring the MER of the selected digital channel at the optimal attenuation level and at the plurality of higher attenuation levels; and wherein step d) includes plotting the MER of the selected digital channel against attenuation level, and determining whether the MER of the selected digital channel first increases and then decreases with increasing attenuation level.

19. The method of claim 18, further comprising, prior to step a), empirically determining the optimal attenuation level by plotting an MER of a balanced digital channel against attenuation level.

20. The method of claim 11, further comprising, after step d), indicating the imbalance in the power level of the selected digital channel.

* * * * *